(12) United States Patent
Napper et al.

(10) Patent No.: US 8,219,908 B2
(45) Date of Patent: Jul. 10, 2012

(54) DIGITAL INK DATABASE SEARCHING USING HANDWRITING FEATURE SYNTHESIS

(75) Inventors: Jonathon Leigh Napper, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 1185 days.

(21) Appl. No.: 10/492,169

(22) PCT Filed: Oct. 15, 2002

(86) PCT No.: PCT/AU02/01395
§ 371 (c)(1),
(2), (4) Date: Apr. 9, 2004

(87) PCT Pub. No.: WO03/034276
PCT Pub. Date: Apr. 24, 2003

(65) Prior Publication Data
US 2005/0222848 A1 Oct. 6, 2005

(30) Foreign Application Priority Data

Oct. 15, 2001 (AU) .................................. PR8243

(51) Int. Cl.
G06F 3/048 (2006.01)
G06F 7/00 (2006.01)
(52) U.S. Cl. ........ 715/268; 715/227; 715/256; 715/259; 707/706; 707/E17.14; 382/189; 382/190
(58) Field of Classification Search .................. 715/541, 715/269, 268, 200, 205, 229, 230, 232, 233, 715/256, 263, 700; 707/705, 706, 707, 708, 707/763, 769, 771, 912, 913, E17.14; 382/187, 382/190, 191, 197, 198
See application file for complete search history.

(56) References Cited

U.S. PATENT DOCUMENTS

| 4,864,618 | A | | 9/1989 | Wright et al. | |
|---|---|---|---|---|---|
| 5,051,736 | A | | 9/1991 | Bennett et al. | |
| 5,063,600 | A | * | 11/1991 | Norwood | 382/186 |
| 5,220,649 | A | * | 6/1993 | Forcier | 715/273 |
| 5,392,363 | A | * | 2/1995 | Fujisaki et al. | 382/187 |
| 5,454,046 | A | * | 9/1995 | Carman, II | 382/186 |
| 5,477,012 | A | | 12/1995 | Sekendur | |
| 5,581,633 | A | * | 12/1996 | Hotta et al. | 382/171 |

(Continued)

FOREIGN PATENT DOCUMENTS

EP 0866397 A 9/1998

(Continued)

OTHER PUBLICATIONS

Suhm et al.,"Multimodal Error Correction for Speech User Interfaces",ACM, 2001, pp. 60-98.*

(Continued)

*Primary Examiner* — Maikhanh Nguyen (57) ABSTRACT

A system and method for ink database searching using handwriting feature synthesis is disclosed which allows a digital ink database to be searched using a text-based query. Using a writer-specific handwriting model derived from a handwriting recognition system or suitable training procedure, a text query is converted into feature vectors that are similar to the feature vectors that would have been extracted had the author of the digital ink database written the text query by hand. The feature vectors are then used to search the database.

5 Claims, 6 Drawing Sheets

U.S. PATENT DOCUMENTS

| | | | | |
|---|---|---|---|---|
| 5,583,543 | A * | 12/1996 | Takahashi et al. | 345/173 |
| 5,652,412 | A | 7/1997 | Lazzouni et al. | |
| 5,661,506 | A | 8/1997 | Lazzouni et al. | |
| 5,666,438 | A * | 9/1997 | Beernink et al. | 382/189 |
| 5,687,254 | A * | 11/1997 | Poon et al. | 382/229 |
| 5,692,073 | A | 11/1997 | Cass | |
| 5,757,959 | A * | 5/1998 | Lopresti | 382/186 |
| 5,757,962 | A * | 5/1998 | Gallo et al. | 382/204 |
| 5,757,964 | A * | 5/1998 | Lee et al. | 382/229 |
| 5,768,417 | A * | 6/1998 | Errico et al. | 382/186 |
| 5,768,423 | A * | 6/1998 | Aref et al. | 382/228 |
| 5,818,963 | A * | 10/1998 | Murdock et al. | 382/187 |
| 5,832,474 | A * | 11/1998 | Lopresti et al. | 707/2 |
| 5,852,434 | A | 12/1998 | Sekendur | |
| 5,953,451 | A * | 9/1999 | Syeda-Mahmood | 382/187 |
| 6,076,734 | A | 6/2000 | Dougherty et al. | |
| 6,084,985 | A * | 7/2000 | Dolfing et al. | 382/187 |
| 6,157,731 | A * | 12/2000 | Hu et al. | 382/119 |
| 6,275,611 | B1 * | 8/2001 | Parthasarathy | 382/187 |
| 6,355,889 | B1 | 3/2002 | Butcher et al. | |
| 6,430,551 | B1 * | 8/2002 | Thelen et al. | 707/3 |
| 6,785,417 | B1 * | 8/2004 | Williamson et al. | 382/186 |
| 6,964,374 | B1 | 11/2005 | Djuknic et al. | |
| 7,188,313 | B2 * | 3/2007 | Hughes et al. | 715/263 |
| 7,627,596 | B2 * | 12/2009 | Kwok et al. | |
| 2002/0107885 | A1 * | 8/2002 | Brooks et al. | 707/505 |
| 2002/0165873 | A1 * | 11/2002 | Kwok et al. | 707/500 |
| 2003/0101163 | A1 * | 5/2003 | Lui et al. | 707/1 |
| 2006/0050962 | A1 * | 3/2006 | Geiger et al. | 382/186 |
| 2008/0005651 | A1 * | 1/2008 | Grefenstette et al. | 715/500 |

FOREIGN PATENT DOCUMENTS

| | | |
|---|---|---|
| GB | 2306669 A | 5/1997 |
| JP | 10-289242 | 10/1998 |
| JP | 2001-148123 | 5/2000 |
| WO | WO 99/18487 A2 | 4/1999 |
| WO | WO 99/50787 A1 | 10/1999 |

OTHER PUBLICATIONS

Aref et al.,"The Handwritten Trie: Indexing Electronic Ink", ACM, 1995, pp. 151-162.*

Isokoski, Poika, "Model for Unistroke Writing Time", ACM, 2001, pp. 357-364.*

Makhoul et al.,"On-Line Cursive Handwriting Recognition Using Hidden Markov Models and Statistical Grammars", 1994, Association for Computational Linguistics, pp. 432-436.*

Liu et al., "Word Graph based Speech Recognition Error Correctiopn by Handwriting Input", ACM, 2006, pp. 339-346.*

Aref et al.,"On Handling Electronic Ink", ACM, 1995, pp. 564-567.*

Lui et al., Accelerating feature-vector matching using multiple-tree and sub-vector methods, Elsevier Science inc., pp. 2392-2399.*

Makhoul et al.,"On-Line Cursive Handwriting Recognition Using Hidden Markov Models and Statistical Grammars", Association for Computational Linguistics, 1994, pp. 432-436.*

Lui et al.,"Accelerating feature-vector matching using multiple-tree and sub-vector methods", Elsevier Science inc., 2007, pp. 2392-2399.*

Karmel et al. "Retrieving Electronic Ink by Content" Proceedings of the 1996 International Workshop on Multi-Media Database Management System, Aug. 14-16, 1996, IEEE pp. 54-61.

Aref, W and Barbara, D et al. "Supporting Electronic Ink Databases" Information Systems, Elsevier Science Ltd , 'Online' vol. 24, No. 4, Jun. 1999, pp. 303-326, XP002352185 Retrieved from the Internet: URL: http://www.sciencedirect.com/science/article/B6V0G-3XR26OC-2/2/ea912693fe3479d02fada93766dd56f3 'retrieved on Nov. 2, 2005'.

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

Kwok T et al "Ink Retrieval from Handwritten Documents" Lecture Notes on Computer Science, 'Online' col. 1983, 2000, pp. 461-466 XP002352186 Springer-Verlag, Berlin, Heidelberg. Retrieved from the Internet URL http://www.springerlink.com/media/5n4dyvlyuk3j7a768x2m/contributions/7/c/c/x/7ccxqlmq8k8v96rr.pdf 'retrieved on Nov. 2, 2005'.

Kamel, I et al. "Retrieving electronic ink by content" Proceedings of the International Workshop on Multi-Media Database Management Systems, IEEE Computer Society Pres, Los Alamitos, CA, US, Aug. 14, 1996, pp. 54-61. XP002980744.

Kamel, I et al. "Retrieving electronic ink by content" Proceedings of the International Workshop on Multi-Media Database Management Systems, IEEE Computer Society Pres, Los Alamitos, CA, US, Aug. 14, 1996, pp. 54-61, XP002980744.

* cited by examiner

DIGITAL INK DATABASE SEARCHING USING HANDWRITING FEATURE SYNTHESIS

CROSS-REFERENCE TO RELATED APPLICATION

This application is a national phase application of PCT/AU02/0395, filed on Oct. 15, 2002, all of which is herein incorporated by reference.

TECHNICAL FIELD

The present invention broadly relates to digital processor implemented handwriting searching or recognition systems, and in particular, to a method of and apparatus for searching of a digital ink database using handwriting feature synthesis from a search query in text form.

BACKGROUND ART

"Digital ink database" as used herein refers to a database which stores handwritten characters, for example a string of handwritten characters forming a handwritten letter.

Overview

Pen-based computing systems provide a convenient and flexible means of human-computer interaction. Most people are very familiar with using pen and paper. This familiarity is exploited by known systems which use a pen-like device as a data entry and recording mechanism for text, drawings or calculations which are quite naturally supported by this medium. Additionally, written ink is a more expressive format than digital text, and ink-based systems can be language-independent.

The increasing use of pen computing and the emergence of paper-based interfaces to networked computing resources (for example see: P. Lapstun, *Netpage System Overview*, Silverbrook Research Pty Ltd, 6 Jun., 2000; and, Anoto, "Anoto, Ericsson, and Time Manager Take Pen and Paper into the Digital Age with the Anoto Technology", Press Release, 6 Apr., 2000), has highlighted the need for techniques which are able to store, index, and search (raw) digital ink. Pen-based computing allows users to store data in the form of notes and annotations, and subsequently search this data based on hand-drawn queries. However, searching handwritten text is more difficult than traditional text (e.g. ASCII text) searching due to inconsistencies in the production of handwriting and the stylistic variations between writers.

Digital Ink Database Searching

The traditional method of searching handwritten data in a digital ink database is to first convert the digital ink database and corresponding search query to standard text using pattern recognition techniques, and then to match the query text with the converted standard text in the database. Fuzzy text searching methods have been described, see P. Hall and G. Dowling, "Approximate String Matching", *Computing Surveys,* 12(4), pp. 381-402, 1980, that perform text matching in the presence of character errors, similar to those produced by handwriting recognition systems.

However, handwriting recognition accuracy remains low, and the number of errors introduced by handwriting recognition (both for the database entries and for the handwritten query) means that this technique does not work well. The process of converting handwritten information into text results in the loss of a significant amount of information regarding the general shape and dynamic properties of the handwriting. For example, some letters (e.g. 'u' and 'v', 'v' and 'r', 'f' and 't', etc.) are handwritten with a great deal of similarity in shape. Additionally, in many handwriting styles (particularly cursive writing), the identification of individual characters is highly ambiguous.

Various techniques for directly searching and indexing a digital ink database are known in the prior art, see for example: A. Poon, K. Weber, and T. Cass, "Scribbler: A Tool for Searching Digital Ink", *Proceedings of the ACM Computer-Human Interaction*, pp. 58-64, 1994; I. Kamel, "Fast Retrieval of Cursive Handwriting", *Proceedings of the $5^{th}$ International Conference on Information and Knowledge Management*, Rockville, Md. USA, Nov. 12-16, 1996; W. Aref, D. Barbera, P. Vallabhaneni, "The Handwritten Trie: Indexing Electronic Ink", *The 1995 ACM SIGMOD International Conference on Management of Data*, San Jose, Calif., May 1995; W, Aref, D. Barbera, D. Lopresti, and A. Tomkins, "Ink as a First-Class Datatype in Multimedia Databases", *Database System—Issues and Research Direction*, pp. 113-163, 1996; and, R. Manmatha, C. Han, E. Riseman, and W. Croft, "Indexing Handwriting Using Word Matching", *Proceedings of the First ACM International Conference on Digital Libraries*, pp. 151-159, 1996.

These systems use a similarity measure to compare a feature vector derived from a set of query pen strokes with a database of feature vectors derived from the digital ink database. The entries in the database that exhibit the greatest degree of similarity with the query are returned as matches. Additionally, some approaches create an index or use a partitioning scheme to avoid a sequential search of all entries in the database. See for example: D. Barbara, W. Aref, I. Kamel, and P. Vallabhaneni, "Method and Apparatus for Indexing a Plurality of Handwritten Objects", U.S. Pat. No. 5,649,023; D. Barbara and I. Kamel, "Method and Apparatus for Similarity Matching of Handwritten Data Objects", U.S. Pat. No. 5,710,916; D. Barbara and H. Korth, "Method and Apparatus for Storage and Retrieval of Handwritten Information", U.S. Pat. No. 5,524,240; D. Barbara and W. Aref, "Method for Indexing and Searching Handwritten Documents in a Database", U.S. Pat. No. 5,553,284; R. Hull, D. Reynolds, and D. Gupter, "Scribble Matching", U.S. Pat. No. 6,018,591; A. Poon, K. Weber, and T. Cass, "Searching and Matching Unrecognized Handwriting", U.S. Pat. No. 5,687,254; and, W. Aref and D. Barbara, "Trie Structure Based Method and Apparatus for Indexing and Searching Handwritten Databases with Dynamic Search Sequencing", U.S. Pat. No. 5,768,423.

Other studies, J. Hollerbach, "An Oscillation Theory of Handwriting", *Biological Cybernetics*, pp. 139-156, 1981, and, Y. Singer and N. Tishby, "Dynamical Encoding of Cursive Handwriting", *IEEE Conference on Computer Vision and Pattern Recognition,* 1993, describe efforts to model the physical properties of handwriting for handwriting synthesis.

DISCLOSURE OF INVENTION

The digital ink database searching techniques previously described are dependent on an ink query that is generated by the writer who authored the digital ink database. However, it would be beneficial if a digital ink database was searchable using other input mechanisms, for example, using a text query entered with a computer keyboard, or spoken and recognized by a voice recognition system. Alternatively, a third party may wish to search the digital ink database, either using his or her own handwriting, or using a text-based query.

Ink database searching using handwriting feature synthesis allows a digital ink database to be searched using a text-based query. Using a writer-specific handwriting model derived from a handwriting recognition system or suitable training procedure, a text query is converted into feature vectors that are similar to the feature vectors that would have been extracted had the author of the digital ink database written the text query by hand. The feature vectors are then used to search the database, for example by using traditional techniques. This allows the searching of a digital ink database when the only input mechanism available is text entry, and can allow a person other than the author of the digital ink database to search the digital ink database.

According to a broad form of the present invention, there is provided a method of searching a digital ink database using a text query, the method including:

performing a search of a lexicon consisting of a table of letter sequences and associated feature vectors, and determining a sequence of lexicon entries which contain letter sequences that can be combined to produce the text query;

obtaining a set of feature vectors corresponding to the sequence of lexicon entries; and, using the set of feature vectors to search the digital ink database.

According to a particular embodiment of the present invention, the lexicon is part of a handwriting model obtained from the author of the digital ink database using handwriting recognition results.

In an embodiment of the present invention the handwriting model stores a mapping of letter sequences to feature vectors. Preferably, the lexicon includes multiple feature vectors for each letter sequence. Also preferably, if more than one sequence of lexicon entries is determined, then the sequence of lexicon entries having the least number of entries is used.

In further embodiments, the text query is obtained by converting handwritten input into text using a handwriting recognition system, and/or, by converting voice input into text using a voice recognition system.

In a specific form of the present invention, the handwriting recognition results are obtained by:

sampling the handwriting;
smoothing the handwriting using a filter;
performing slant correction;
using a zone estimation algorithm to perform height normalisation;
using feature extraction to perform segmentation into sub-strokes and generation of feature vectors;
using feature reduction of the set of feature vectors;
performing vector quantization to cluster the feature vectors and generate code word vectors; and,
searching a dictionary for the most likely word from the generated text letters.

According to a further broad form of the present invention, there is provided apparatus for searching a digital ink database using a query, the apparatus including:

an input device for a user to input the query;
a processor able to receive the query and communicate with the digital ink database;
means to convert the query to a text query, if the query is not already a text query;
means for performing a search of a lexicon and determining a sequence of lexicon entries which contain letter sequences that can be combined to produce the text query;
means for obtaining a set of feature vectors corresponding to the sequence of lexicon entries;
means for searching the digital ink database using the set of feature vectors; and an output device to display the results of the search to the user.

According to another aspect of an embodiment of the present invention, the text query is generated from handwriting using a different handwriting model than the handwriting model used to generate the feature vectors for searching.

According to still a further broad form of the present invention, there is provided apparatus for searching a digital ink database using a query, the apparatus including:

a store for storing the digital ink database;
a processor, the processor being adapted to:
perform a search of a lexicon and determine a sequence of lexicon entries which contain letter sequences that can be combined to produce the text query;
obtain a set of feature vectors corresponding to the sequence of lexicon entries;
use the set of feature vectors to search the digital ink database;

wherein, the lexicon is part of a handwriting model obtained from the author of the digital ink database using handwriting recognition results.

BRIEF DESCRIPTION OF FIGURES

The present invention should become apparent from the following description, which is given by way of example only, of a preferred but non-limiting embodiment thereof, described in connection with the accompanying figures, wherein.

MODES FOR CARRYING OUT THE INVENTION

The following modes are described as applied to the written description and appended claims in order to provide a more precise understanding of the subject matter of the present invention.

I. Preferred Embodiment

The present invention provides a method and apparatus for searching a digital ink database using a text query. In the figures, incorporated to illustrate the features of the present invention, like reference numerals are used to identify like parts throughout the figures.

Figure 1:
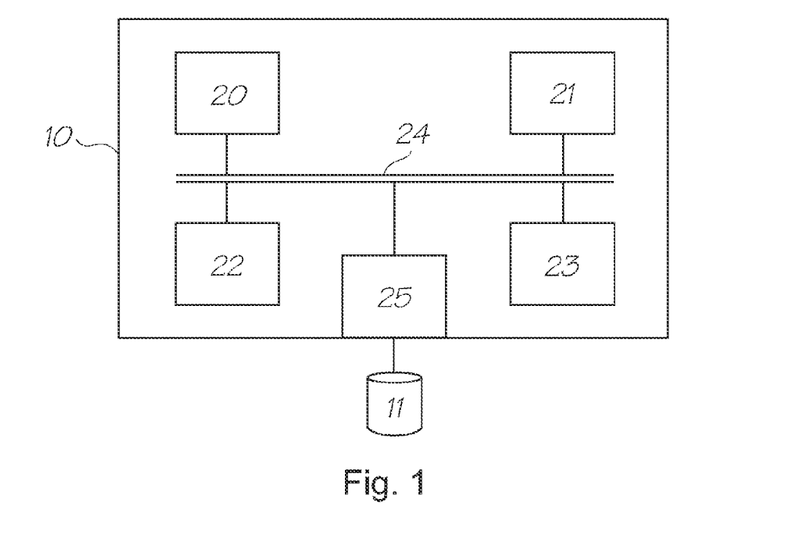
FIG. 1 illustrates a processing system.

Embodiments of the present invention can be realised using a processing system an example of which is shown in FIG. 1. In particular, the processing system 10 generally includes at least a processor 20, a memory 21, and an input device 22, such as a graphics tablet and/or keyboard, an output device 23, such as a display, coupled together via a bus 24 as shown. An external interface is also provided as shown at 25, for coupling the processing system to a digital ink database 11.

In use, the processing system 10 is adapted to allow data to be stored in and/or retrieved from the digital ink database 11. The processor 20 receives handwriting data, a text query, etc., via the input 22. From this, it will be appreciated that the processing system 10 may be any form of processing system or terminal such as a computer, a laptop, server, specialised hardware, or the like.

Modelling Handwriting

The writer-specific handwriting model describes the handwriting style of a particular user. Most user-adaptive handwriting recognition systems generate some kind of model to account for the stylistic variations between individual users. Generally, the purpose of these handwriting models is to map the feature vectors extracted from a set of input pen strokes into a set of letters that represent the recognized text.

Figure 2:
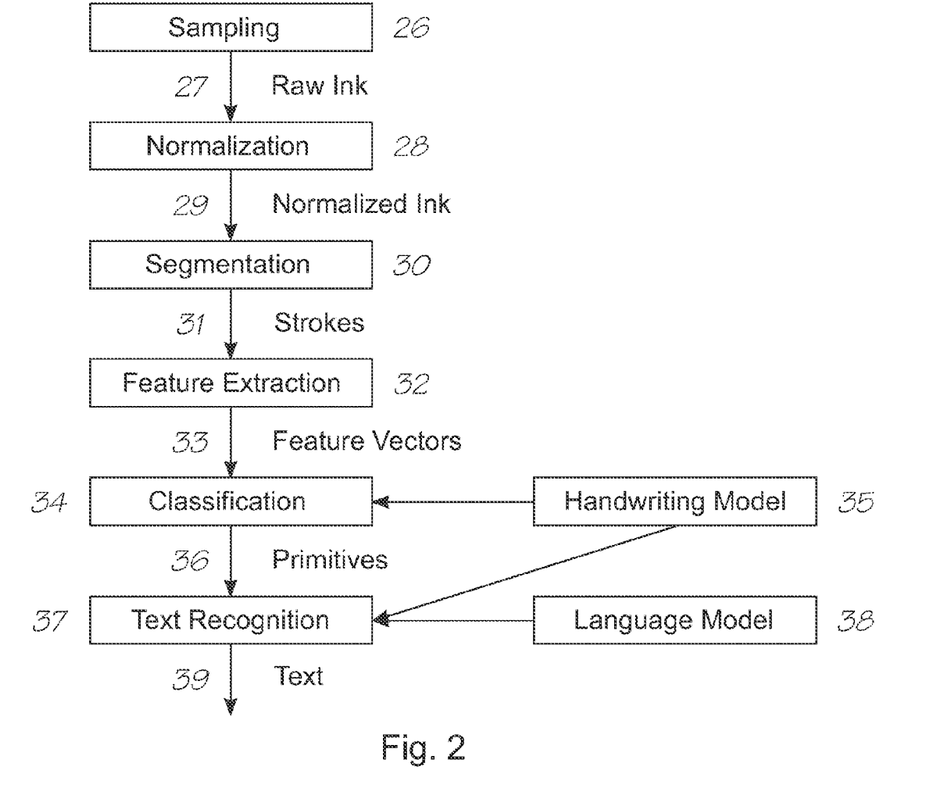
FIG. 2 illustrates an overview of the handwriting recognition method.

However, the feature synthesis approach to digital ink searching uses a writer-specific handwriting model to perform the inverse mapping. That is, the model is used to convert query text into a set of feature vectors that approximate the features that would have been extracted had the writer written the query text by hand. FIG. 2 details the general steps in a handwritten text recognition system. The handwriting is sampled 26 and raw ink 27 is passed to a normalization step 28. The normalized ink 29 undergoes a segmentation step 30 and the resulting strokes 31 are passed to a feature extraction step 32 which extracts the feature vectors 33. Classification step 34 is then performed using the handwriting model 35, which produces the primitives 36. Text recognition step 37 receives the primitives 36 and uses the language model 38 and/or handwriting model 35 to generate text 39 corresponding to raw ink 27.

To use feature synthesis for ink database searching, an additional step is required. The writer-specific handwriting model 35 is required to be modified to store information that allows text to be mapped to ink features. To perform this mapping, a table (called a lexicon) translating individual letters and groups of letters (i.e. sequences of letters) into features is included in the handwriting model. After recognition has been performed, letters in the output text and the corresponding feature vectors used for recognition can be added to the lexicon.

Groups of commonly co-occurring letters and their corresponding feature vectors are concatenated and added to the lexicon. This is desirable since handwriting exhibits co-articulation effects (where the writing of a letter is influenced by the shape of surrounding letters) and commonly written letters (e.g. "qu", "ed", and "ing") are likely to exhibit co-articulation. By storing the feature vectors of letter groups, a more accurate rendering of the query ink can be produced that considers the contextual effects of the stroke sequence.

The lexicon should be able to store multiple feature vectors for each letter sequence. Since the same letters can be recognized many times, the lexicon should be able to select the feature vectors that best represents the letters. This can be done by storing all feature vector sequences output by the recognizer for each letter sequence, together with a count of the number of times that feature vector sequence has been seen for that letter sequence. The feature vector sequence with the highest count (i.e. the most frequently seen and thus most probable) for a letter sequence is then used during feature synthesis.

The choice of which letter groups should be stored can be based on character transition statistics (for example, as derived from a text corpus) where character sequences with a high probability of occurrence are stored (e.g. the probability of "ing" is much greater than the probability of "inx"). Alternatively, all possible letter groupings can be stored after recognition, with some kind of culling procedure executed when the table becomes too large (for example, least-recently used).

Further improvements can be achieved by explicitly modeling word endings in the lexicon. Many writing styles exhibit poorly written characters at the end of words. This is particularly apparent in handwritten word suffixes such as "ing", "er", and "ed". To model this behavior, an end of word character is appended to the letter sequence (e.g. "ing#") to indicate that this letter sequence models a word ending. During feature synthesis, these entries can only be used to complete a query word.

Feature Synthesis

Figure 3:
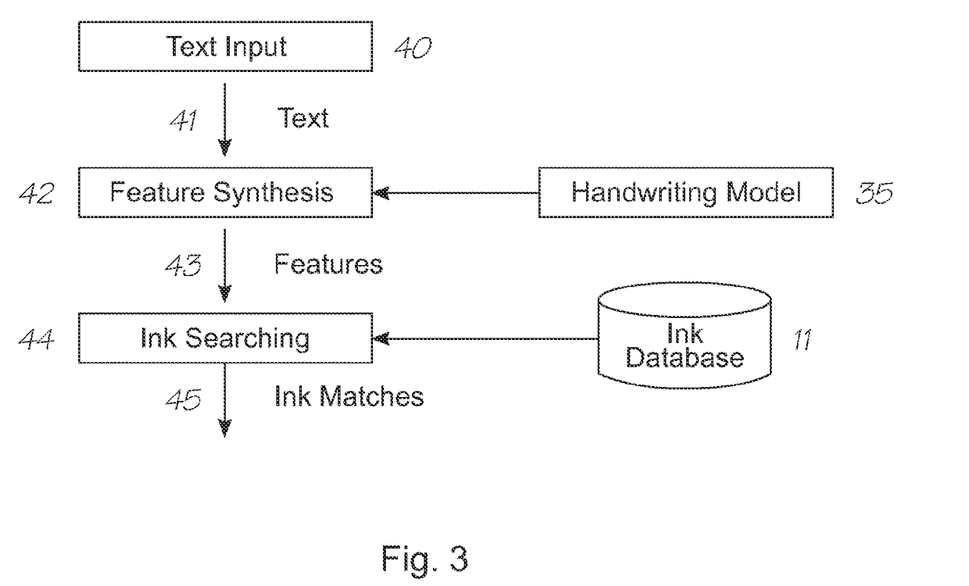
FIG. 3 illustrates the digital ink database searching method using feature synthesis.

To search a digital ink database, the text query is converted to a set of feature vectors by the feature synthesis procedure that uses the writer-specific handwriting model. These feature vectors are then used as the query term for searching the digital ink database. The ink database search can be performed using traditional ink matching techniques. FIG. 3 describes this procedure. At step 40 text is input and the text 41 provided to feature synthesis step 42 which uses the handwriting model 35 to generate features 43. The features 43 are used in an ink searching step 44 of the digital ink database 11. This produces ink matches 45.

To perform feature synthesis, a search of the lexicon is performed to locate a sequence of lexicon entries that contain letter sequences that can be combined to produce the query text. The stored feature vectors are concatenated to produce the query feature vector. However, there may be a number of different combinations of lexicon entries that can be used to create the query text. It is assumed that using the minimum number of entries possible to produce the text will most accurately model the contextual effects. For example, assume the following entries exists in the lexicon:

TABLE 1

| Example lexicon | |
|---|---|
| b | bo |
| bor | borr |
| ed | ow |
| rr | rowed |

The word "borrowed" can then be created as (bo)(rr)(ow)(ed), (borr)(ow)(ed), or (bor)(rowed), with the final construction being most the desirable since it is composed from the fewest elements.

A* Lexicon Search

For accurate results, the lexicon is expected to be very large, and the number of potential lexicon entry combinations for a word would be exponential. For queries containing long words, a complete enumeration of all permutations may not be practical. A modified A* search algorithm, see S. Russell and P. Norvig, *Artificial Intelligence—A Modern Approach*, Prentice Hall, 1995, can be used to search for a letter sequence s, where the path cost function g(s) is the number of lexicon entries used so far to create the text, and the estimated cost to the goal is:

h(s)=1, if length(s)<length(query)
=0, otherwise

This heuristic states that at least one additional lexicon entry is required to complete the letter sequence if the sequence has fewer letters than the query word. Nodes in the search tree are sorted by g(s)+h(s) (with lower scores being superior) and nodes with the same score are ordered by the number of letters in the sequence (with higher being superior).

Note that h(s) is a monotonic and admissible heuristic (i.e. it never overestimates the cost of reaching the goal) so the search is guaranteed to find the optimal solution and is optimally efficient (i.e. expands the fewest nodes possible to find the optimal solution). Proof of this result is given in R. Dechter and J. Pearl, "Generalized Best-First Search Strategies and the Optimality of A*", *Journal of the Association for Computing Machinery*, 32(3), pp. 505-536, 1985.

As an example of the above procedure, the search for the word "borrowed" is given below. Each row in the table represents a search node, with higher scoring nodes located at the top of the table:

| s | g(s) | h(s) | g(s) + h(s) | # Letters |
|---|------|------|-------------|-----------|
| (borr) | 1 | 1 | 2 | 4 |
| (bor) | 1 | 1 | 2 | 3 |
| (bo) | 1 | 1 | 2 | 2 |

The most promising node at the top of the table is expanded, resulting in:

| s | g(s) | h(s) | g(s) + h(s) | # Letters |
|---|------|------|-------------|-----------|
| (bor) | 1 | 1 | 2 | 3 |
| (bo) | 1 | 1 | 2 | 2 |
| (borr)(ow) | 2 | 1 | 3 | 6 |

Again, the most promising node is expanded:

| s | g(s) | h(s) | g(s) + h(s) | # Letters |
|---|------|------|-------------|-----------|
| (bor)(rowed) | 2 | 0 | 2 | 8 |
| (bo) | 1 | 1 | 2 | 2 |
| (borr)(ow) | 2 | 1 | 3 | 6 |

The top node is now a completed sequence, and no other node in the search can produce a better score, so this node is selected as the search result.

II. Various Embodiments

IIA. Feature Synthesis without Handwriting Recognition

Ink searching using feature synthesis can be performed without using a handwriting recognition system. The technique only requires the ability to build a lexicon of letter sequences and associated feature vectors to model the handwriting of the writer who authored the digital ink database.

If handwriting recognition results are not available for modelling, a training procedure can be used to generate the writer-specific lexicon. To do this, a user provides a sample of their handwriting by copying a specified training text, which is then used to build the lexicon. The training procedure is not required to perform full handwriting recognition since the text represented by the handwriting is already known; rather, it simply needs to segment the input into characters and strokes, convert the strokes into features, and store the appropriate letter groups and associated feature vectors in the lexicon.

The training text used to build the lexicon should be optimized to provide a balanced example set of individual letters and letter groups. That is, it should maximize the coverage of likely character unigrams, bigrams, and trigrams, see J. Pitrelli, J. Subrahmonia, M. Perrone, and K. Nathan, "Optimization of Training Texts for Writer-Dependent Handwriting Recognition", *Advances in Handwriting Recognition*, World Scientific Publishing, 1999, with an emphasis on letters and letter sequences that are most likely to be encountered.

IIB. Different Features for Recognition and Ink Matching

It is desirable that both the handwriting recognition system and the ink-matching algorithm use the same feature representations, since the features used to search the digital ink database are derived from the results of the handwriting recognition.

However, it is possible to use different feature sets for the recognition and search provided the recognition features can be transformed into the search features. Some feature sets can allow a transformation from recognition features to search features to be learned from a set of training data.

Alternatively, many feature sets can allow the regeneration of an approximation of the digital ink from the recognition features, from which the second feature set can be extracted. That is, the text query is converted to a set of feature vectors using feature synthesis, and the inverse transformation of the feature-extraction process is applied to the features to convert them into digital ink from which the search features are extracted. Care must be taken to ensure that this procedure does not introduce artifacts in the digital ink that may affect the search feature extraction (e.g. discontinuities in the generated ink may cause problems for some feature extraction techniques).

IIC. Third-Party Ink Searching

A person can search the digital ink database of another writer by using handwriting recognition to convert their ink input into text, and using feature synthesis to convert the recognized text into features for ink searching.

Figure 4:
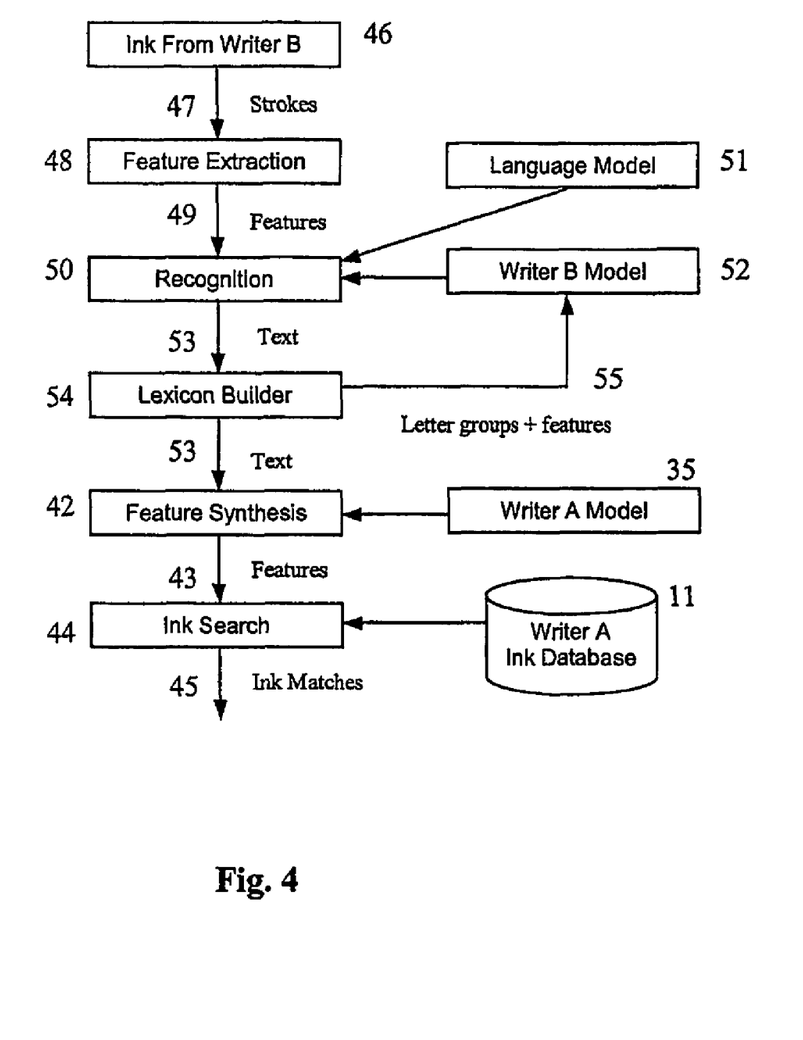
FIG. 4 illustrates a third party ink database searching method.

FIG. 4 depicts this situation, with writer B searching the digital ink database authored by writer A. At step 46 ink is received from writer B and the strokes 47 are passed to feature extraction step 48. The features 49 are extracted and recognition step 50 uses a language model 51 and writer B model 52 to generate corresponding text 53. This is used to build a lexicon for writer B at lexicon builder step 54. Letter groups and features are sent back to writer B model 52 to improve/update the model. The text 53 then undergoes feature synthesis step 42 and a similar process as that described with reference to FIG. 3 is then followed to retrieve ink matches 45 that have been authored by writer A.

III. Further Example

The following example provides a more detailed outline of one embodiment of the present invention. This example is intended to be merely illustrative and not limiting of the scope of the present invention.

This section describes in detail an implementation of ink database searching using feature synthesis. It is assumed that a number of preprocessing steps have been performed, including word and character segmentation, and baseline orientation normalization. Note that this is just one possible way to implement the technique; there are alternate methods available for each stage of the process. For example, there are many different segmentation schemes, feature sets, handwriting models, and recognition procedures that could also be used.

Figure 5:
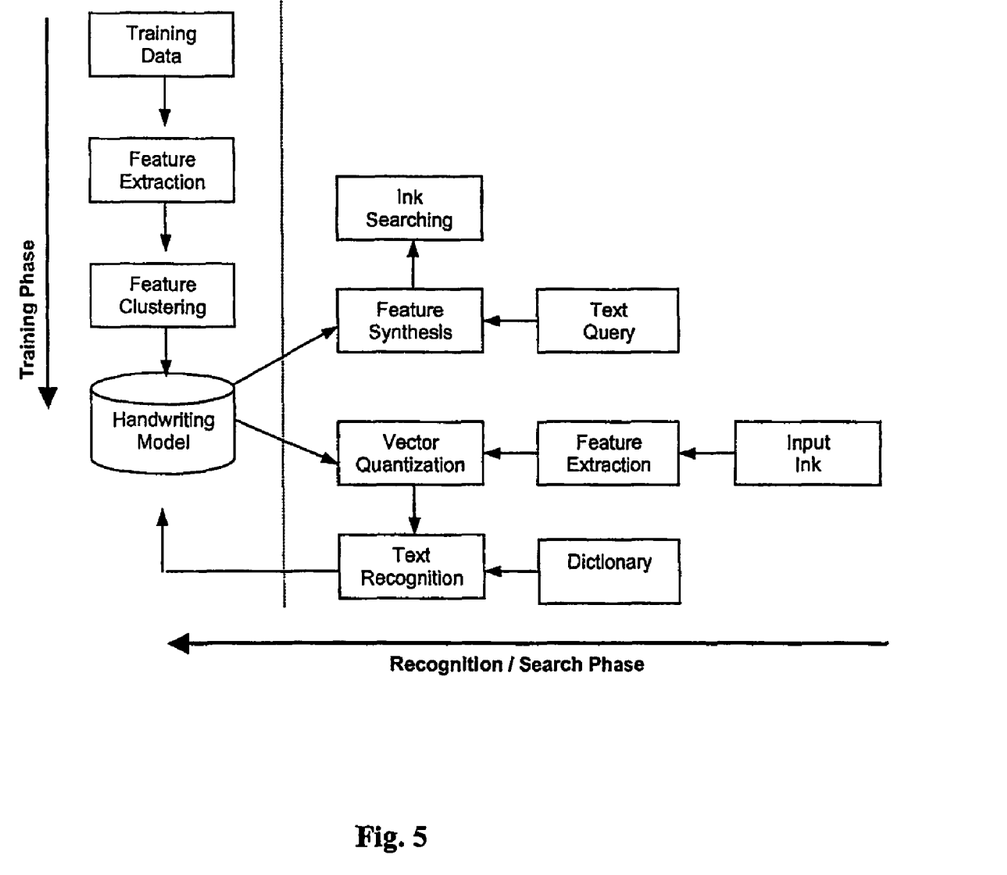
FIG. 5 illustrates training and recognition/search phases.

The procedure for handwriting recognition and ink searching using feature synthesis requires a training phase and a recognition or searching phase. During the training phase, a set of training data is converted to stroke features that are clustered into stroke primitives and used to create a model of the handwriting. For recognition and ink searching, this model is used to decode input ink or synthesize features for ink searching. This process is depicted in FIG. 5. Note that the same preprocessing, normalization, segmentation, and feature extraction procedure is used for training, recognition and searching.

Figure 6:
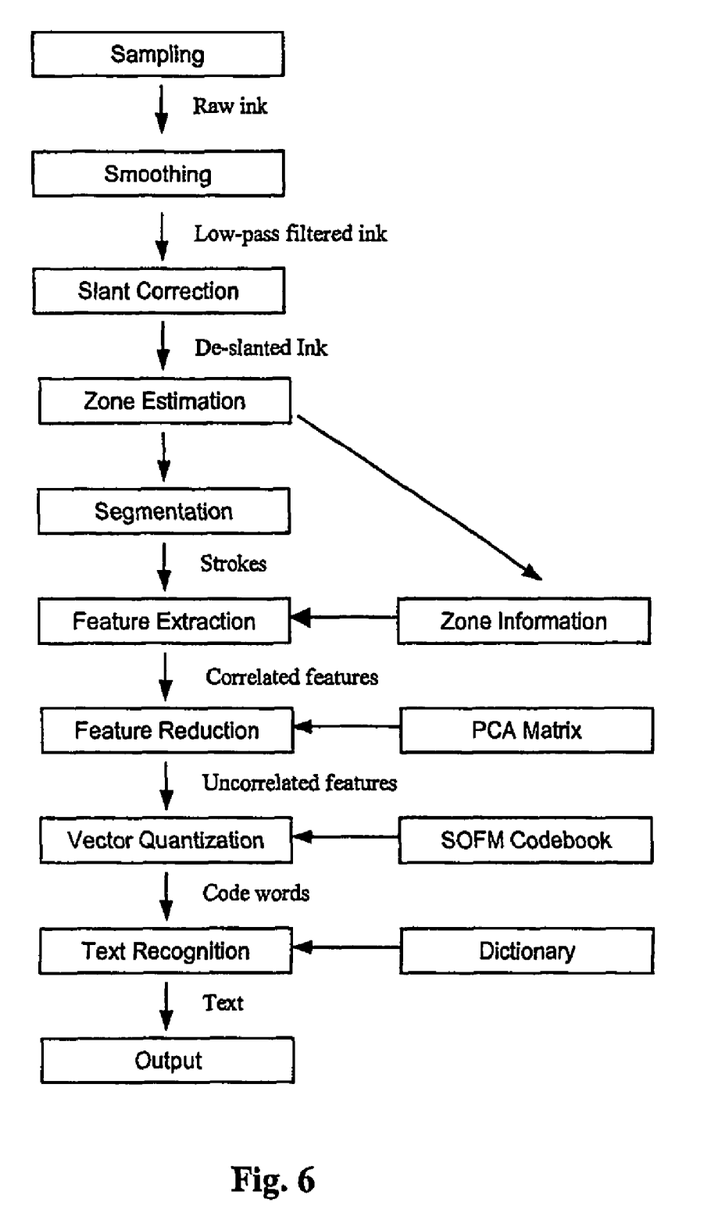
FIG. 6 illustrates a method for handwriting recognition.

The handwriting recognition system maps input ink into a set of stroke code words that are used to search a dictionary for matching words. FIG. 6 provides an overview of this process, with the individual steps described below in more detail.

Smoothing

The ink is sampled at a constant rate of 100 Hz. Research has shown that handwriting has a peak spectral density at around 5 Hz that declines to noise level at about 10 Hz, see H. Teulings and F. Maarse, "Digital Recording and Processing of Handwriting Movements", *Human Movement Science,* 3, pp. 193-217, 1984. Thus, a low-pass filter with a cutoff at 10 Hz will remove the high-frequency noise without affecting the relevant spectral components of the handwriting signal.

A low-pass filter conforming to the above specifications can be produced by circularizing the point coordinates, performing an FFT to remove the high frequency components, and recreating the signal using an inverse-FFT. However, a simple weighted averaging filter works as effectively. To smooth a sequences of points $\{p_1 \ldots p_n\}$:

$$p_i = \sum_{j=-k}^{k} \alpha_j p_{i+j}$$

where $$\sum_{j=-k}^{k} \alpha_j = 1$$

The filter width k and a smoothing coefficients are determined empirically.

Slant Correction

Many handwriting styles do not have a vertical principal axis of the drawn letters (i.e. the letters are drawn at a consistent slant). Removing handwriting slant is a normalization that can improve the recognition of handwritten letters. In handwriting, down-strokes are considered the most stable and consistent strokes, and thus are useful for detecting handwritten slant.

To detect handwritten slant, a weighted-average direction of the down strokes in points $\{p_1 \ldots p_n\}$ is estimated:

$$\text{slant} = \frac{\sum_{i=2}^{n} d_i a_i}{\sum_{i=2}^{n} d_i}$$

where $\alpha_i$=angle $(p_i, p_{i-1})$
$d_i = \|p_i - p_{i-1}\|$ if $\alpha_1 < \alpha_i < \alpha_2$ =0 otherwise Angles $\alpha_1$ and $\alpha_2$ define which stroke segments are considered as parts of a down stroke and are empirically set at 40° and 140° respectively (with 90° representing a vertical line). If the estimated slant deviates more than a certain threshold from the vertical, slant is removed using a shear transformation:

$$x_i = \frac{(y_{max} - y_i) \times \tan(90° - \text{slant})}{y_{max} - y_{min}}$$

where $y_{min}$ and $y_{max}$ represents the top and bottom of the bounding rectangle of the ink.

Zone Estimation

Zone estimation is used to normalize the height of the input ink. English letters exhibit three zones—the middle zone (corresponding to the height of letters such as 'a', 'c', 'e', etc.), and the upper and lower zones that contain the ascenders and descenders in letters such as 'b', 'd', 'g', and 'j'.

Zone estimation is performed using a horizontal histogram of ink density. That is, the number of ink crossings is determined for an equally spaced series of horizontal lines passing through the bounding rectangle of the ink. The central peak of the histogram is found, as are the two points on either side of the histogram where the ink density drops below a certain fraction of the central peak height. These two points are selected as the upper and lower bounds of the middle zone. The upper and lower zones are defined as the space between the middle zone and the vertical extremum of the bounding rectangle.

Feature Extraction

The ink is segmented into sub-strokes at extrema in the vertical direction (i.e. at local maxima and minima of the Y coordinates). For segmentation to occur, the lengths of the two sub-strokes produced by splitting the stroke at the selected segmentation point must exceed a pre-calculated minimum distance (set at half the height of the estimated middle zone).

The segmented sub-strokes are then re-sampled to contain a constant n number of points located equidistantly along the stroke trajectory. A feature vector is then created for the sub-stroke by normalizing the coordinates:

$$x'_i = \frac{x_i - x_{min}}{h}$$

$$y'_i = \frac{y_i - y_{middle}}{h}$$

where $x_{min}$=X minimum of sub-stroke bounding rectangle
$y_{middle}$=Y coordinate of the top of the middle zone
h=the height of the middle zone (i.e. $y_{base} - y_{middle}$)

The feature vector is then created from the normalized coordinates as $f_i = \{x'_1, y'_1, \ldots, x'_n, y'_n\}$.

Feature Reduction

The resulting vectors describe the sub-strokes using a large number of highly correlated features (clearly, the coordinates of point $p_i$ are dependent on point $p_{i-1}$ and so on). To lower the dimensionality of the vectors to m (where m<2n), the Karhunen-Loeve transform (see Principal Component Analysis—R. Duda, P. Hart, and D. Stork, *Pattern Classification*, Second Edition, John Wiley & Sons, Inc., pp. 569-570, 2001) is used. This procedure projects the higher-dimensionality features into a lower dimension using linear mapping that is optimal in a least-squares sense.

To do this, the covariance (autocorrelation) matrix for the set of all training feature vectors $X = \{f_1, \ldots, f_n\}$ is calculated using:

$$C = \frac{1}{m-1} X^T X$$

The eigenvectors and eigenvalues for this matrix are found (using the tridiagonal QL implicit algorithm, see W. Press, B. Flannery, S. Teukolsky, and W. Vetterling, W. T., *Numerical*

Recipes in C, Cambridge: Cambridge University Press, 1988), and the eigenvectors corresponding to the largest n eigenvalues are used to form the PCA matrix Z. The feature vectors are then multiplied by this matrix to transform the features into a new feature space with an orthogonal uncorrelated axis:

$$f_i' = f_i^T Z$$

Vector Quantization

The transformed feature vectors are then clustered using a Kohonen Self-Organizing Feature Map (SOFM), see T. Kohonen, "Self-Organized Formation of Topologically Correct Feature Maps", *Biological Cybernetics*, 43, pp. 59-69, 1982. This technique uses an unsupervised learning procedure to cluster the input vectors such that distance and proximity relationships between the vectors is maintained as far as possible. The SOFM used has a 2-dimensional structure, with visually similar code words (i.e. clusters) located near each other. As a result, the distance between two code words can be easily calculated using some distance measure (e.g. Euclidean distance) between the code word values.

SOFM training is performed iteratively using a simple two-layer neural network that is initialized with random weights. The best matching output neuron for a normalized input training vector x is found using minimum Euclidean distance:

$$o(x) = \arg\min_i^n \|x - w_i\|$$

where $w_i$ represents the weight vector of output node i. The weights of the node with the highest activation value and those nodes surrounding it (as determined by a neighborhood function $\Lambda$) are updated using:

$$w_i(t+1) = w_i(t) + \eta(t)[x - w_i(t)]$$

where $\eta$ is a learning rate function and $\eta$ and $\Lambda$ are typically varied over time t. Training continues until there is no noticeable change to the neuron weights during an iteration of the training set.

To convert a sequence of sub-strokes to a code word vector, each sub-stroke feature vector is quantized using the trained SOFM and appended to the code word vector. A feature vector is quantized into a code word by selecting the largest activation value for the output neurons of the SOFM codebook:

$$q = \arg\max_i^n x^T w_i$$

Handwriting Model

The handwriting model stores a mapping of stroke code word vectors to letters (for text recognition) and the reverse mapping of letter groups to code word vectors (for feature synthesis). To build the handwriting model, each letter in the training data is converted to a code word vector that is stored in a table, along with the corresponding letter.

Note that a specific code word sequence may map to a number of letters (e.g. poorly-drawn 'u' may map to the same feature vectors as a 'v') and individual letters may be mapped to by a number of code word vectors. By maintaining a count of the number of times the code word vector represented a specific letter, the probability that the vector represents the letter $x_i$ can be calculated given n lexicon entries for letter $x_i$:

$$P(x_i) = \frac{c_i}{\sum_{j=1}^{n} c_j}$$

where $c_i$ is the count of the number of times the code word vector has been encountered representing the letter $x_i$. The following is an example entry from the table that represents the hypothetical code word vector {3,4}:

TABLE 2

Example code word vector entry

| $x_i$ | $c_I$ | $P(x_i)$ |
|---|---|---|
| 'u' | 120 | 0.54 |
| 'v' | 91 | 0.41 |
| 'r' | 12 | 0.05 |

This table indicates that if the code word sequence {3,4} is encountered in the input, there is a probability of 0.54 that it represents the letter 'u', a probability 0.41 that it represents an 'v', and a probability of 0.05 that it represents an 'r'.

The reverse mapping table is produced in a similar way, storing code word vectors associated with letters and groups of letters.

Recognition

Figure 7:
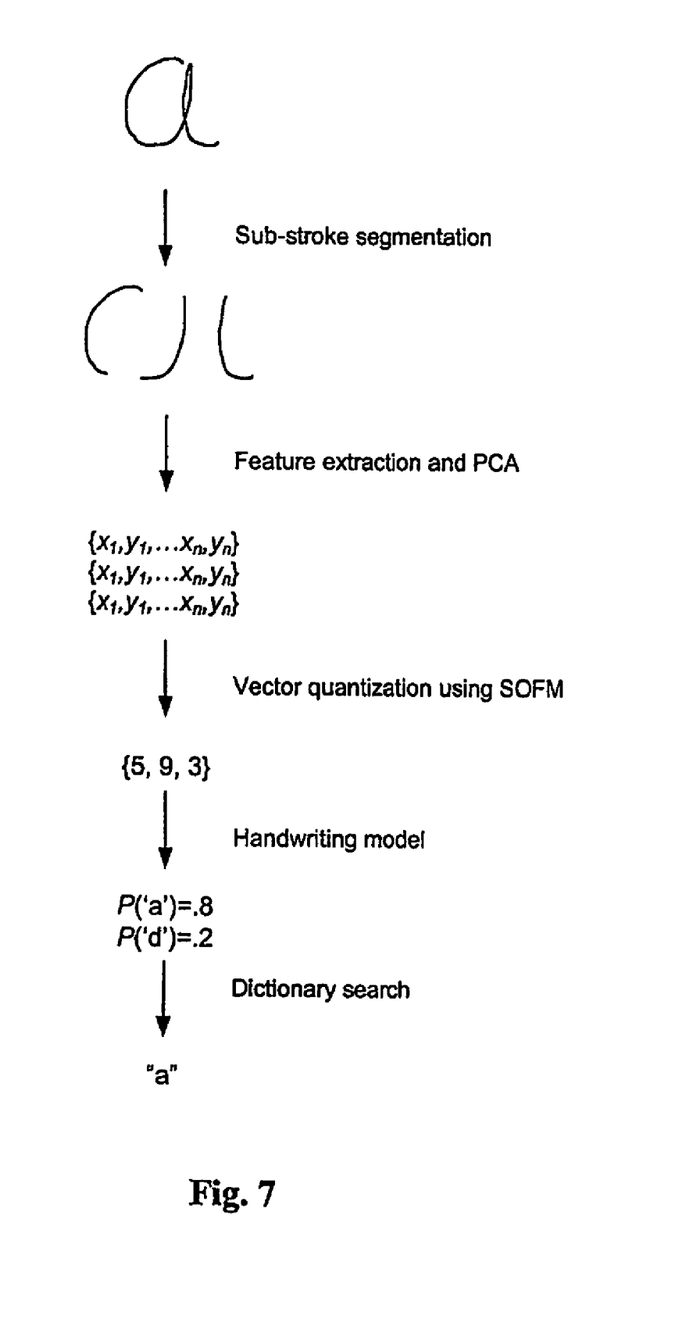
FIG. 7 illustrates an example for text recognition.

To perform handwriting recognition, the input ink is processed as described above, and the resulting code word vectors are used to search the handwriting model to produce letter hypotheses. A best-first search strategy is used to search a dictionary for the most likely word given the derived letter probabilities. The process is depicted below in FIG. 7.

Ink Searching

Ink searching is performed by using the handwriting model generated during handwriting recognition to map the input query text into a sequence of code words. This code word vector is used to search the digital ink database using an elastic matching technique. A full description of a similar ink-matching technique is given in D. Lopresti and A. Tomkins, "Temporal-Domain Matching of Hand-Drawn Pictorial Queries", *Handwriting and Drawing Research: Basic and Applied Issues*, IOS Press, pp. 387-401, 1996. The resulting queries are then ordered by similarity and presented to the user.

Thus, there has been provided in accordance with the present invention, a method and apparatus for searching a digital ink database using a text query which satisfies the advantages set forth above.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Although the preferred embodiment has been described in detail, it should be understood that various changes, substitutions, and alterations can be made herein by one of ordinary skill in the art without departing from the scope of the present invention as hereinbefore described and as hereinafter claimed.

The invention claimed is:

1. A method of searching a digital ink database, the digital ink database being associated with a predetermined author, the method including the steps of:
   receiving an ASCII text query entered through a computer keyboard;
   mapping the ASCII text query to a set of feature vectors using a handwriting model obtained from the author associated with the digital ink database using handwriting recognition results, the mapping step comprising the sub-steps of;
   performing a search of a lexicon consisting of a table of letter sequences mapped to feature vectors, and determining a sequence of lexicon entries which contain letter sequences that, when combined, produce the text query, the lexicon being part of the handwriting modal, and
   obtaining a set of feature vectors corresponding to the sequence of lexicon entries;
   using the set of feature vectors to search the digital ink database; and
   displaying the results of the search to the user,
wherein the handwriting recognition results are obtained by the steps of:
   sampling handwriting;
   smoothing the handwriting using a filter;
   performing slant correction;
   using a zone estimation algorithm to perform height normalization;
   using feature extraction to perform segmentation into sub-strokes and generation of feature vectors;
   using feature reduction of the set of feature vectors;
   performing vector quantization to cluster the feature vectors and generate code word vectors; and
   searching a dictionary for the most likely word from the code word vectors.

2. The method as claimed, in claim 1, wherein the lexicon includes multiple feature vectors for each letter sequence.

3. The method as claimed in claim 1, wherein the lexicon includes an end of word letter sequences and associated feature vectors.

4. The method as claimed in claim 1, wherein if more than one sequence of lexicon entries is determined contain letter sequences that can be combined to produce the text query, then the sequence of lexicon entries having the least number of entries is used.

5. Apparatus for searching a digital ink database, the digital ink database being associated with a predetermined author, the apparatus including:
   a keyboard for receiving an ASCII text query;
   means for mapping the ASCII text query to a set of feature vectors using a handwriting model obtained from the author associated with the digital ink database using handwriting recognition results, the mapping is performed by performing a search of a lexicon consisting of a table of letter sequences mapped to feature vectors, determining a sequence of lexicon entries which contain letter sequences that, when combined, produce the text query, the lexicon being part of the handwriting model, and obtaining a set of feature vectors corresponding to the sequence of lexicon entries; and
   means for searching the digital ink database using the set of feature vectors; and
   an output device to display the results of the search to the user,
wherein the handwriting recognition results are obtained by the steps of:
   sampling handwriting;
   smoothing the handwriting using a filter;
   performing slant correction;
   using a zone estimation algorithm to perform height normalization;
   using feature extraction to perform segmentation into sub-strokes and generation of feature vectors;
   using feature reduction of the set of feature vectors;
   performing vector quantization to cluster the feature vectors and generate code word vectors; and
   searching a dictionary for the most likely word from the code word vectors.

* * * * *